Jan. 14, 1969     H. B. CARR     3,421,388
ACTUATING AND REDUCING GEAR FOR HEAVY VALVES AND OTHER EQUIPMENT
Filed Aug. 18, 1966     Sheet _1_ of 6
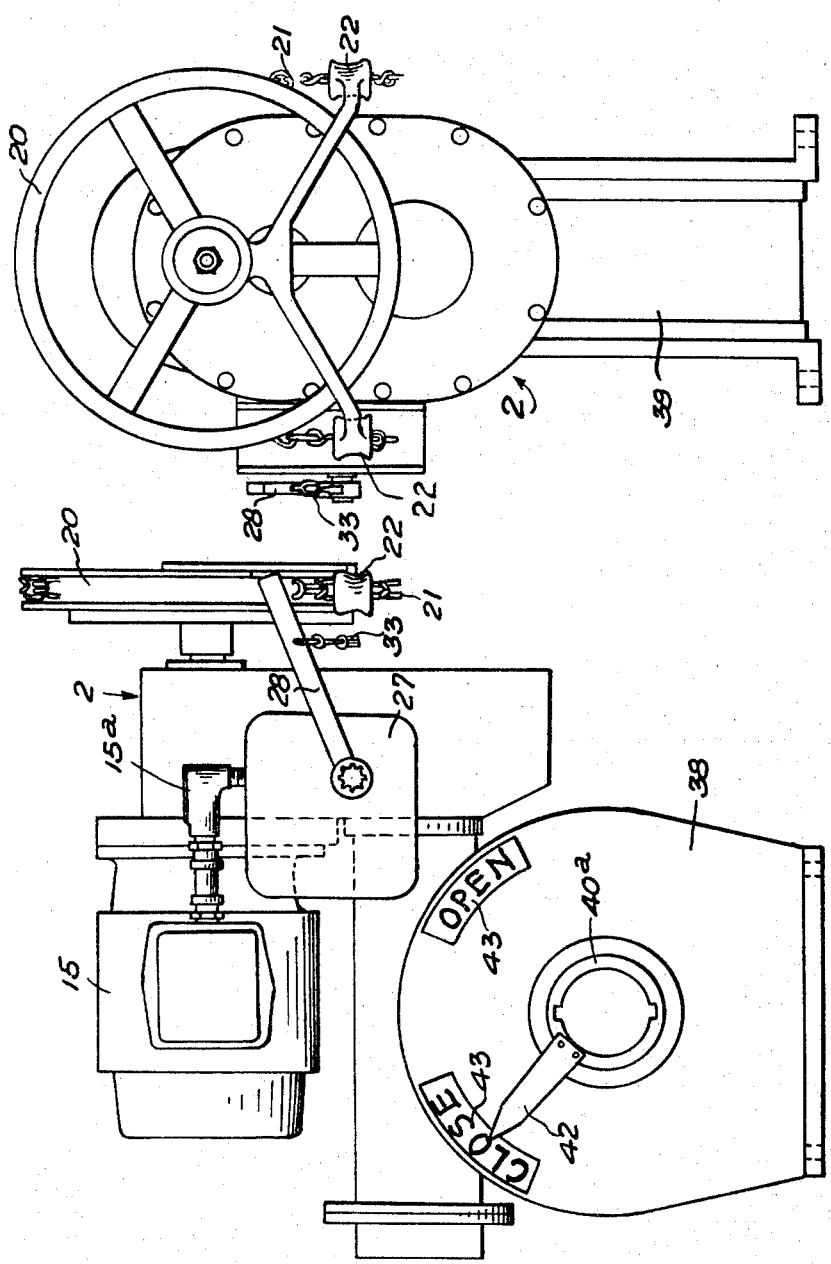
INVENTOR.
HUGH B. CARR.
BY Christy, Parmelee &
 Strickland
his ATTORNEYS.

INVENTOR.
HUGH B. CARR.
BY Christy, Parmelee &
Strickland
his
ATTORNEYS.

INVENTOR.
HUGH B. CARR

United States Patent Office 3,421,388
Patented Jan. 14, 1969

3,421,388
ACTUATING AND REDUCING GEAR FOR HEAVY VALVES AND OTHER EQUIPMENT
Hugh B. Carr, McMurray, Pa., assignor to S. P. Kinney Engineers, Inc., Carnegie, Pa., a corporation of Pennsylvania
Filed Aug. 18, 1966, Ser. No. 573,397
U.S. Cl. 74—625   4 Claims
Int. Cl. F16h 3/10; F16h 45/00

ABSTRACT OF THE DISCLOSURE

An actuating and reducing gear mechanism is disclosed that may be selectively motor driven or hand-operated. A clutch provides for easy hand operation and operation of the clutch prevents operation by the motor while the actuator is being normally operated, however, when manual operation stops, motor drive of the actuator resumes automatically.

---

This invention is for an actuating and reducing gear mechanism to effect the operation of heavy valves such as are employed in blast furnaces and similar heavy rugged equipment.

In a blast furnace plant there are many heavy rugged valves that must be operated, as when one stove is taken off the heating-up cycle and put on blast or bottled up for subsequent on-blast operation. Each blast furnace usually has a complement of at least three stoves, and each must be provided with burner valves, gas valves, chimney valves, hot blast valves, and air inlet valves. The valves must be operated in rapid sequence, and as one stove is taken off blast, another must be placed on blast. With automatic stove changing, the changeover must take place with almost split second timing, and failure can result in the creation of hazardous conditions or loss of production.

While power-driven valve actuators are commercially available, they have been devices primarily intended for other less rugged environments or services. Past experience with automated stove changing in recent years has shown the valve actuators to be a most frequent source of failure.

The present invention has for its primary object to provide an actuator for fast operation of heavy valves and the like especially designed for the rugged environment around blast furnace plants and other industrial environments, particularly where the equipment is automated. Since manual operation is essential in case of power failure, the invention provides for easy and free hand operation, with provision for preventing operation by the motor, should the power failure be restored while the actuator is being manually operated, but which automatically resumes power operation when manual operation stops. With this arrangement, a workman cannot be injured or the cycle of operation be reversed by sudden restoration of power should the workman forget to open a switch, or automatic operation be prevented should he forget to close a motor switch after completing hand operation.

The invention in its more essential aspects provides a casing which supports a driven shaft to which is keyed a small pinion forming the part of a gear reducing train. On this same shaft are two opposed free gears, and a clutch element is splined on the shaft to selectively engage either of these two gears, leaving the other free. Parallel with this driven shaft are two short shafts projecting in opposite directions from the housing. One is a motor shaft having a pinion that is engaged with one of said free gears on the first shaft, and the other has a hand wheel on the exterior of the casing and on its inner end, inside the casing, it has a pinion that is engaged with the other free-turning gear on the first shaft. By moving the clutch, the motor is operatively connected with the driven shaft in one position, and in the other position, the motor drive is ineffective and the hand wheel is operative to turn the driven shaft.

The clutch is operated by a yoke that is movable by a manually-operable hand lever, and this yoke and lever arrangement is spring-biased to normally hold the clutch engaged with the motor-driven gear, so that a hand drive is effective only so long as the lever is held in the position where the hand drive is operable. In connection with this arrangement, there is a limit switch which opens the motor circuit when the lever is moved to engage the clutch with the hand wheel drive.

The reducing gear train may include a worm gear reducer, but the arrangement is such that the worm gear is a removable part of the assembly since, in some cases, it would not be needed.

The invention may be more fully understood by reference to the accompanying drawings, in which:

FIG. 1 is a side elevation of a complete reducing gear unit embodying the invention with the worm gear reducer included;

FIG. 2 is an end elevation at right angles to FIG. 1;

Figure 3:
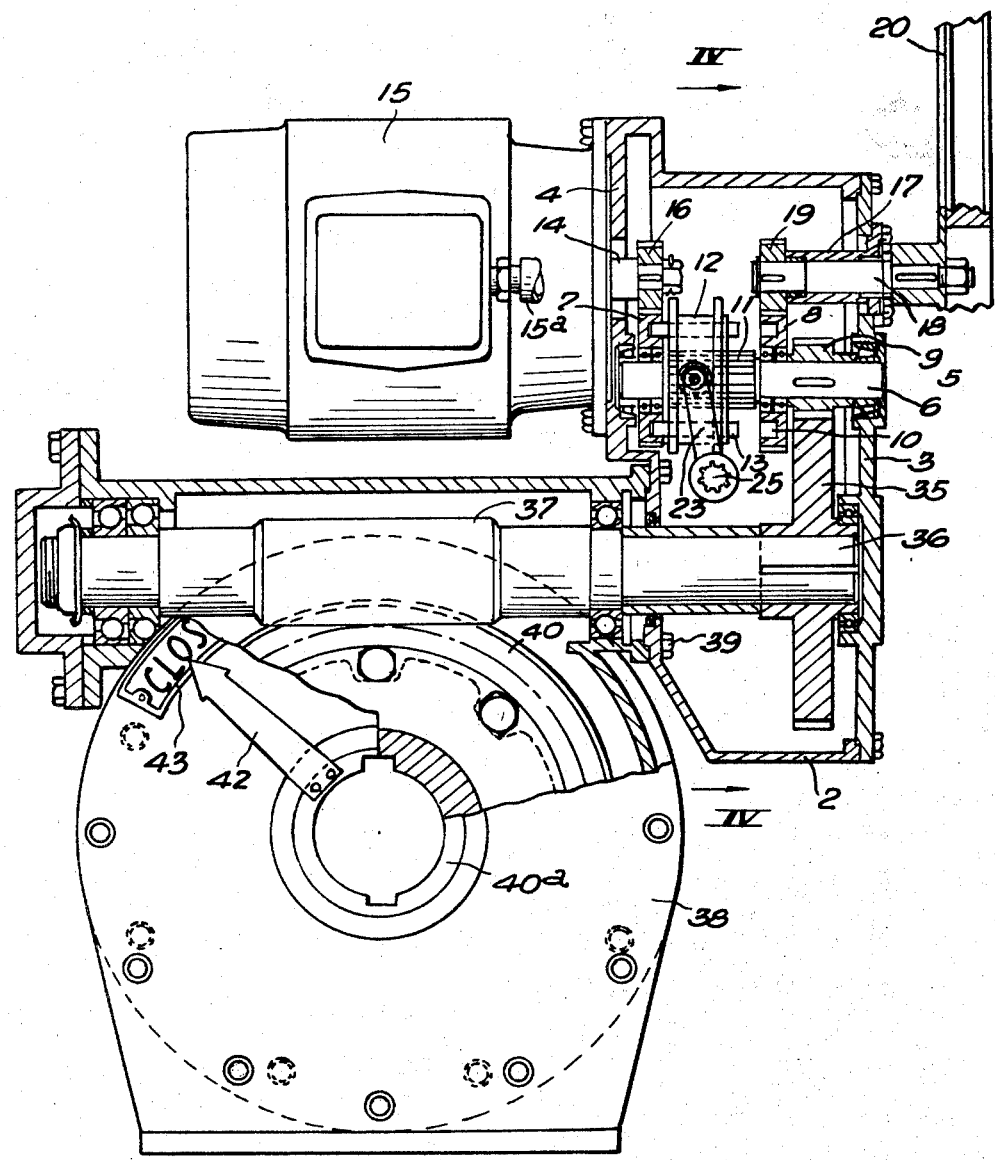
FIG. 3 is a view similar to FIG. 1, but with the reduction gear housing in vertical section, the section being in the plane of line III—III of FIG. 4, but with certain parts shown in elevation.

In the accompanying drawings, wherein like reference numerals refer to like parts throughout, 2 designates a gear casing having side walls 3 and 4. Supported on bearings 5 on the inner faces of the side walls is a driven shaft 6. There are two opposed gear wheels 7 and 8 mounted on this shaft on ball bearings, so that they may freely rotate relatively to the shaft. In addition there is a small pinion 9 keyed to the shaft for rotation therewith. Pinion 9 is located outside the space between the two gear wheels 7 and 8.

Each of the gear wheels is provided with a series of cavities 10. The portion of the shaft 6 between the two gear wheels is splined as indicated at 11, and there is a double-acting clutch 12 slidable along the spline 11, the clutch having pins 13 projecting from each face thereof designed to engage in the cavities 10 of the gear wheels 7 and 8. By moving the clutch 12 in one direction or the other, either gear wheel 7 or gear wheel 8 may be operatively coupled to the shaft 6.

As shown in FIG. 3, a shaft 14, which is motor-driven, projects through the side 4 of the housing. The electric drive motor outside the casing, which is a reversible motor, is designated 15, while the shaft 14 has a pinion 16 thereon inside the casing which meshes with the free-running gear 7.

Directly opposite the motor-driven shaft 14 on the opposite side wall 3 is a bearing sleeve 17 through which passes a shaft 18 that is aligned with the shaft 14. On the inner end of the shaft 18 there is a pinion 19 that meshes with the free-running gear 8. On the outer end of the shaft 18 outside the casing there is a hand wheel 20.

In many cases the hand wheel is located at a considerable elevation above the ground or working platform where it is inaccessible to the operator, so that it is in the form of a sprocket wheel about which passes an operating chain 21, this chain passing through guides 22 as best seen in FIG. 2.

Figure 4:
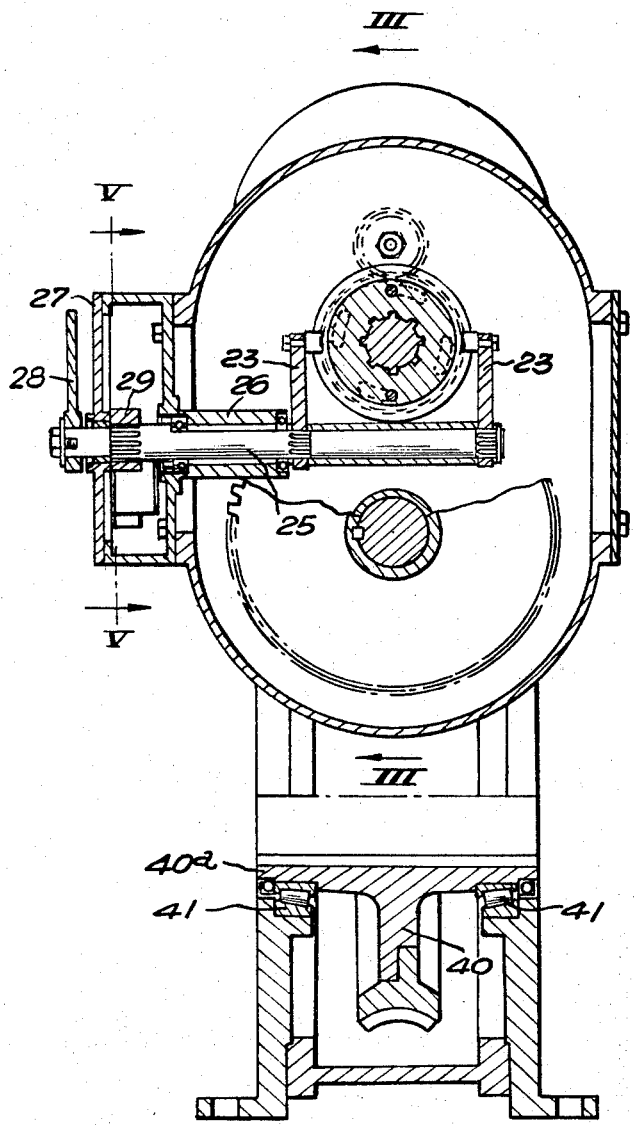
FIG. 4 is a view similar to FIG. 2, but showing the reducing gear in section, the section being in substantially the plane of line IV—IV of FIG. 3, the lower part of the worm gear box also being shown in section.

The clutch 12 is moved back and forth on the spline 11 by means of a yoke 23 best seen in FIG. 4, this yoke being mounted on a rock shaft 25 that is carried in a bearing sleeve 26, the shaft 25 being positioned below the shaft 6 and extending at right angles thereto. The outer end of the shaft 25 passes through a switch box 27 secured to the exterior of the casing, and has a hand lever 28 on the outer end of the shaft 25 by means of which the shaft 25 can be rocked through a limited arc to move the clutch back and forth.

Figure 5:
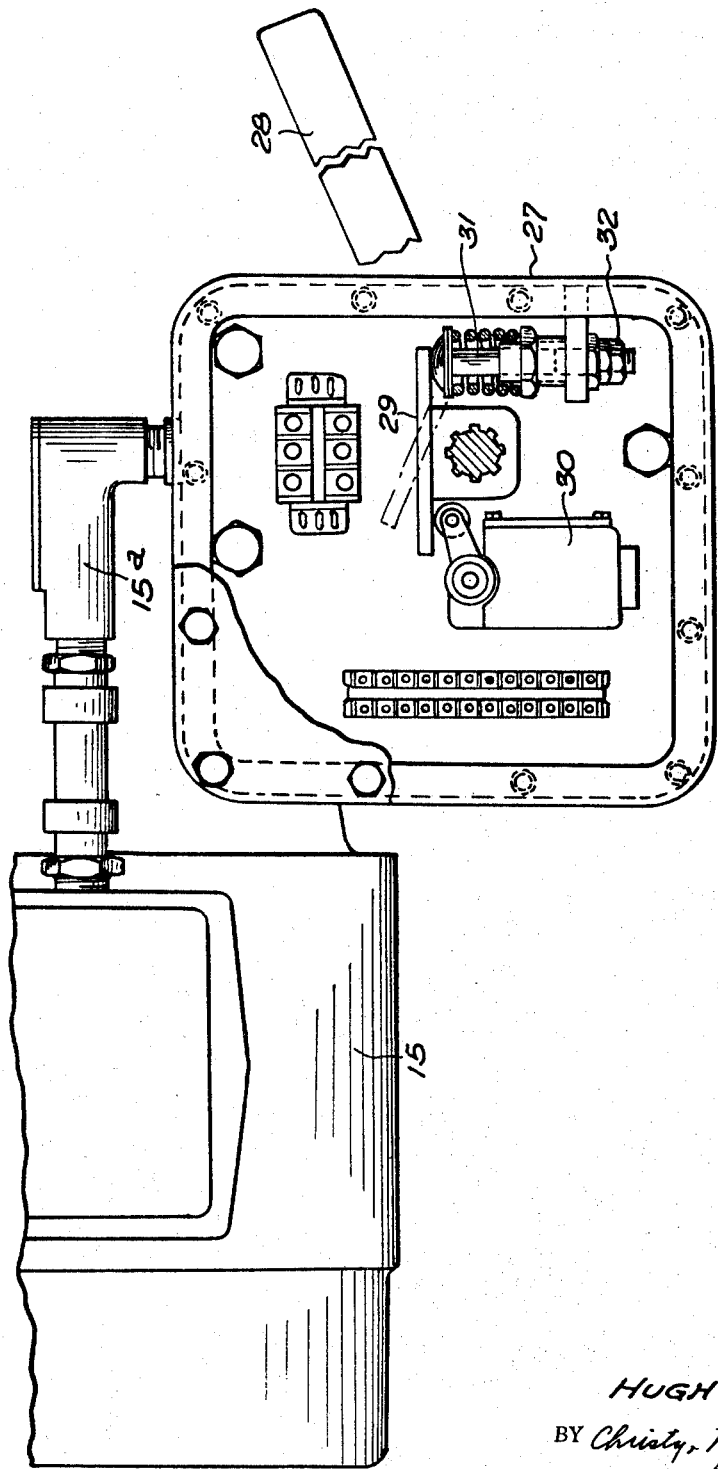
FIG. 5 is a view similar to FIG. 1, but showing part of the switch box cover broken away and certain interior parts in section in substantially the plane of line V—V of FIG. 4.

The shaft 25 also has keyed thereto a cross arm 29 which is positioned inside the switch box, and which projects laterally to both sides of the axis of the shaft 25. Inside the switch box below the cross arm 29, and at one side of the shaft 25, there is a limit switch 30. Correspondingly, located under the other end of the cross arm 29 inside the switch box is a spring-biased plunger 31 that normally urges the lever 29 to the horizontal position as shown in FIG. 5.

In this position the limit switch 31 is closed and the yoke is in the position shown in FIG. 3 where the pins 13 on the clutch 12 are engaged in the recess 10 of the gear wheels 7. Then the switch 30 is connected with the motor 15 so that when the switch is in the position shown in FIG. 5 the motor 15 can be energized from a source (not shown), the switch being in series with the motor, and the wiring is in the conduit 15a. The motor is a reversible motor. To disengage the clutch 12 from the free-running gear 7 and engage it with the free-running gear wheel 8 which is driven by the hand wheel 20, the operator pulls down on the handle 28, shifting the clutch 12 along the spline 11 to bring the pins 13 of the clutch into engagement with the recesses 10 of the gear wheel 8. In so doing, cross arm 29 compresses the spring-pressed plunger 31 and allows the limit switch 30 to open the circuit to the motor 15. Therefore, when the clutch is shifted for manual operation, the motor is rendered inoperative but the spring 31 exerts a biasing force that will return the parts to the position shown in FIG. 5 as soon as the worker releases the hand lever 28. As shown in FIG. 5, the spring-biased plunger 31 has adjusting nuts 32 by means of which the pressure of the spring can be adjusted. Where the hand wheel is at an inaccessible location for hand operation, requiring the use of chains 21, there must also be a chain 33 attached to the hand lever 28 through which the hand lever can be operated from below. Adjustment of the spring which biases the yoke and lever may be factory-adjusted so as to compensate for the weight of the chain that is hung from the lever.

With this arrangement the operator can turn the hand wheel without having to rotate also the motor, and likewise when the motor is operating it does not turn the hand wheel. Should there be a power failure requiring that the mechanism be operated by hand, and the power should be restored while the hand wheel is being operated, the motor will not be energized so that the operator will finish the opening or closing of the valve, whichever task he may be performing, and then release the clutch lever without perhaps reversing the operation he was performing, or possibly creating damage by the sudden engagement of the clutch with the rotating gear wheel 7 rotating.

There is a gear wheel 35 of substantially larger diameter than the pinion 9, which meshes with the pinion 9, and which is carried on a shaft 36 which, in FIG. 3, is a worm gear shaft, but which may be some other driven shaft to be driven by the reducing gear. A gear reduction is provided by reason of the gears 16 and 19 being of smaller diameter than gears 7 and 8 with which they respectively mesh, and by reason of the pinion 9 being substantially smaller in diameter than the gear 35. The axis of the shaft 36 is parallel with the axis of the shaft 6.

Since the actuating device above described is primarily intended to operate a large valve which must be opened or closed in perhaps ten seconds, but in which the operating shaft for the valve moves through a limited arc, the worm gear and shaft-operating device is desirably made as a separate unit, including an enclosure such as the housing designated generally as 38 which is bolted at 39 to the casing 3. The worm 37 meshes with a worm wheel 40 supported in bearings 41 (see FIG. 4) in the housing 38. The worm wheel 40 has a hollow hub into which the shaft of a valve operator or other mechanism may be inserted, to which the shaft would be keyed. On the exterior of the hub 40a of the gear wheel 40 there may be bolted an indicator 42, while legends 43 on the exterior of the housing 38 provide an indication of the position of the valve or other mechanism being operated at any particular point in the rotation of the gear wheel 40. The gear wheel 40 is provided with two keys so that if by any chance it is damaged, it can be turned 180° with respect to the shaft that it drives, and since in this particular application its rotation is less than 180°, the damaged part of the wheel is then in an arc of rotation where it never engages the worm 37.

The assembly thus provides a reducing gear in which the worm prevents any rotation of the gear wheel 40 through reverse force on the gear wheel 40, since the worm gear 37 will drive the worm wheel 40, but the worm wheel 40 cannot drive the worm gear 37.

While the organization of the actuating device is unique, parts are for the most part standard parts that can be purchased so that it is not necessary for the user of the mechanism to maintain a large stock of spare parts on hand.

Figure 8:
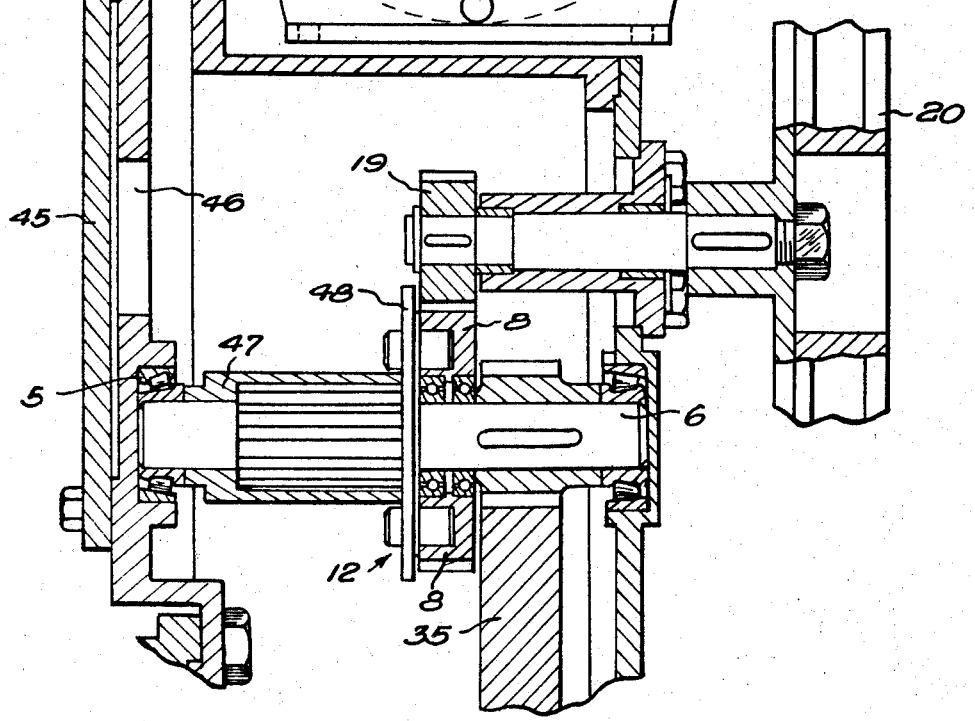
FIG. 8 is a fragmentary sectional view similar to a portion only of FIG. 3, but showing the device stripped of the motor showing the adaptability of the actuator for manual operation only.

The actuating device is extremely versatile in that various size motors, as for example, 3, 5, or 7½ horsepower motors may be interchangeably used in the same position. Should it be necessary to take a motor out of service for any reason, or should the device be initially purchased for hand operation, or with the prospect of being mechanized in the future, the arrangement shown in FIG. 8 may be used, in which the motor which is bolted to the side 4 of the housing 2 is merely replaced by a cover plate 45, the side 4 of the casing having an opening 46 therethrough sufficient to provide for the insertion of or removal of the motor shaft 14 with its pinion 16. In this case the clutch disk 12 and the gear wheel 7 are removed, and there is substituted a sleeve 47 that bears against the end of a plate 48 similar to one end of the clutch 12, and which is splined to the shaft 6. This sleeve is confined against the bearing 5 at the left-hand end of the shaft 6 to hold the plate 48 with its projecting pins in fixed contact with the gear wheel 8. In this instance the yoke 23 and the shaft 25 are either unnecessary, or may be removed until the unit is motorized, when the sleeve 47 is simply removed and the other parts are put in place.

Figure 6:
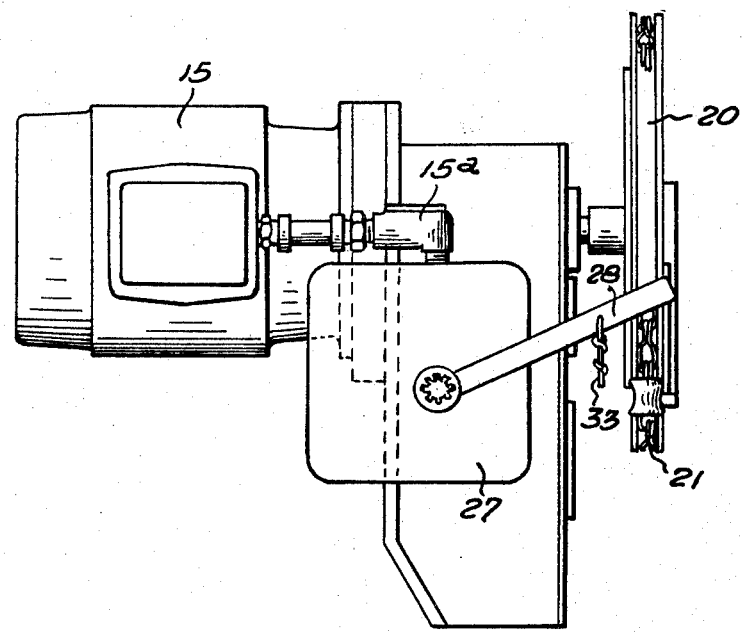
FIG. 6 is an elevation on a smaller scale of the actuator without the worm reducing gear.
Figure 7:
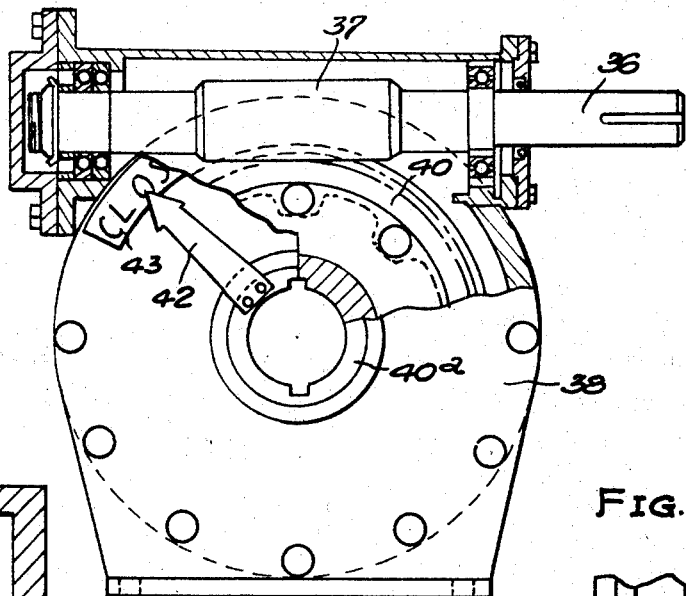
FIG. 7 is an elevation on a smaller scale of the worm reducing gear detached from the actuator.

FIG. 6 shows the actuator as a unit with the worm gear and worm wheel reduction drive removed, and in this case some other shaft than the worm shaft 36 is replaced by some other shaft to be driven. FIG. 7 shows how the worm gear portion of the reducing mechanism is formed as an independent unit which has simply to be bolted at the place on the actuating device by inserting the worm shaft 36 into the center of the gear 35 and putting the bolts 39 in place. This can be done by removing the side plate 3 of the casing 2.

The actuating reducing gear as thus constructed is ruggedly built and adapted for the operation of blast furnace valves and other heavy equipment. The motor operation is generally controlled in the conventional manner through limit switches on the mechanism which the gearing herein described operates. Various changes and modifications may be made in the specific construction and design of parts within the contemplation of my invention and under the scope of the following claims.

I claim:
1. An actuator and reduction gear for use in operating heavy equipment comprising:
  (a) a casing having opposed side walls,
  (b) a shaft extending through one side wall having a hand wheel at its outer end and a gear wheel on its inner end,
  (c) a second shaft on the other side wall parallel with the first one and having a motor on its outer end and a gear wheel on its inner end.
  (d) a third shaft inside the casing parallel with the first two and extending between the two side walls, said shaft having two spaced free-turning gears thereon, one of which meshes with the gear on the first shaft and the other of which meshes with the gear on the second shaft,
  (e) a clutch member splined on said third shaft selectively movable into shaft-turning engagement with one or the other of said free-turning gears whereby the hand wheel or motor may be operably connected with said third shaft,
  (f) means carried by the casing for shifting the clutch comprising
    (1) a shifting yoke engaging the clutch,
    (2) a rock shaft at right angles to the first, second and third shafts supported by the casing and on which the yoke is mounted,
    (3) a lever on said rock shaft accessible at the exterior of the casing for moving the yoke and thereby shift the clutch,
    (4) a limit switch for said motor,
    (5) an arm on said rock shaft cooperating with said switch to effect opening thereof when the lever is operated to engage the clutch with the free-turning gear that is driven by the hand wheel and close when the rock shaft is moved to engage the clutch with the other of said free-turning gears, and
    (6) biasing means operatively engaging said arm arranged to urge the rock shaft and yoke to hold the clutch engaged with said other free-turning gear while is driven by the motor,
  (g) a pinion fixed on said third shaft, and
  (h) a driven gear wheel in the casing meshing with said pinion to be rotated theeby, said driven gear wheel having a hub to receive a shaft to be rotated thereby,
  (i) said first two gear wheels being smaller in diameter than the free-turning gears with which they mesh, said pinion on the third shaft being of smaller diameter than the free-turning gears, said last-named gear wheel being of substantially larger diameter than the pinion whereby to provide a selectively operable reducing gear train between both the hand wheel-operated shaft and the motor-operated shaft on the one hand and the last-named driven gear wheel on the other.

2. An actuator and reducing gear mechanism as defined in claim 1 in which there is connected with said casing a worm gear shaft enclosure with a shaft therein having a worm gear thereon, said shaft being keyed into the hub of said driven gear wheel, and a worm gear wheel in said enclosure meshing with the worm gear and having a sleeve-like hub adapted to receive a shaft to be turned by said worm wheel.

3. An actuator and reduction gear for use in operating heavy equipment comprising:
  (a) a casing having opposed side walls,
  (b) a shaft extending through one side wall having a hand wheel at its outer end and a gear wheel on its inner end,
  (c) a second shaft on the other side wall parallel with the first one and having a motor on its outer end and a gear wheel on its inner end,
  (d) a third shaft inside the casing parallel with the first two and extending between the two side walls, said shaft having two spaced free-turning gears thereon, one of which meshes with the gear on the first shaft and the other of which meshes with the gear on the second shaft,
  (e) a clutch member splined on said third shaft selectively movable into shaft-turning engagement with one or the other of said free-turning gears whereby the hand wheel or motor may be operably connected with said third shaft,
  (f) means carried by the casing for shifting the clutch comprising a shifting yoke engaging the clutch, an operating lever on the exterior of the casing connected with said yoke for moving it, and biasing means effective for normally holding the clutch in operating engagement with the motor-driven free-turning gear, the biasing means being adustable to compensate for added weight when a chain is hung from said lever,
  (g) a limit switch in circuit with the motor,
  (h) means connected with said lever for controlling the operation of the switch to close it only when the clutch is in normal position,
  (i) a pinion fixed on said third shaft, and
  (j) a driven gear wheel in the casing meshing with said pinion to be rotated thereby, said driven gear wheel having a hub to receive a shaft to be rotated thereby,
  (k) said first two gear wheels being smaller in diameter than the free-turning gears with which they mesh, said pinion on the third shaft being of smaller diameter than the free-turning gears, said last-named gear wheel being of substantially larger diameter than the pinion whereby to provide a selectively operable reducing gear train between both the hand wheel-operated shaft and the motor operated shaft on the one hand and the last-named driven gear wheel on the other.

4. An actuator and reduction gear for use in operating heavy equipment comprising:
  (a) a casing having opposed side walls,
  (b) a shaft extending through one side wall having a hand wheel at its outer end and a gear wheel on its inner end,
  (c) a second shaft on the other side wall parallel with the first one and having a motor on its outer end and a gear wheel on its inner end,
  (d) a third shaft inside the casing parallel with the first two and extending between the two side walls, said shaft having two spaced free-turning gears thereon, one of which meshes with the gear on the first shaft and the other of which meshes with the gear on the second shaft,
  (e) a clutch member splined on said third shaft selectively movable into shaft-turning engagement with one or the other of said free-turning gears whereby the hand wheel or motor may be operably connected with said third shaft,
  (f) means carried by the casing for shifting the clutch,
  (g) a pinion fixed on said third shaft,
  (h) a driven gear wheel in the casing meshing with said pinion to be rotated thereby, said driven gear wheel having a hub to receive a shaft to be rotated thereby,
  (i) said first two gear wheels being smaller in diameter than the free-turning gears with which they mesh, said pinion on the third shaft being of smaller diameter than the free-turning gears, said last-named gear wheel being of substantially larger diameter than the pinion whereby to provide a selectively operable reducing gear train between both the hand wheel-operated shaft and the motor-operated shaft on the one hand and the last-named driven gear wheel on the other, (j) a second separate casing removably bolted to the first, (k) a worm gear shaft mounted in said second casing having a worm gear thereon and having a projecting end keyed into the hub of said driven gear wheel, and (l) a worm gear wheel mounted in the second casing operatively engaging the worm gear on the worm gear shaft, said worm wheel having a hub in which the shaft of a valve or other mechanism to be driven can be keyed.

References Cited

UNITED STATES PATENTS

| | | | |
|---|---|---|---|
| 2,724,289 | 11/1955 | Wight | 74—625 |
| 2,745,294 | 5/1956 | Kron | 74—625 |
| 2,911,843 | 11/1959 | Mitchell | 74—665 |
| 3,209,871 | 10/1965 | Moericke | 74—665 |

FRED C. MATTERN, Jr., *Primary Examiner.*

W. S. RATLIFF, Jr., *Assistant Examiner.*